United States Patent

[11] 3,554,339

[72] Inventor Williams S. Richardson
Fox Point, Wis.
[21] Appl. No. 836,458
[22] Filed June 25, 1969
[45] Patented Jan. 12, 1971
[73] Assignee The Falk Corporation
Milwaukee, Wis.
a corporation of Delaware

[54] OVERRUNNING POSITIVE AND SYNCHRONIZED CLUTCH
5 Claims, 4 Drawing Figs.
[52] U.S. Cl. ..................................... 192/20,
192/35, 192/44, 192/46
[51] Int. Cl. ..................................... F16d 15/00,
F16d 23/02
[50] Field of Search ........................................ 192/20, 30,
35, 45, 46, 36, 53.3, 44(Cursory), 38

[56] References Cited
UNITED STATES PATENTS
2,408,506 10/1946 Briskin et al. .................. 192/44
3,246,726 4/1966 Richardson .................. 192/47

Primary Examiner—Benjamin W. Wyche
Attorney—Thomas W. Ehrmann and Adrian L. Bateman Jr.

ABSTRACT: An overrunning clutch is shown which is adapted to connect a drive shaft to an externally driven shaft when the speed of the shafts are in synchronization and to overrun when the speed of the externally driven shaft is greater than the speed of the drive shaft. Engagement of the clutch is effected by the rotation of trigger pinions mounted in a housing connected to the driven shaft, such rotation causing a shift of a sleeve rotatably about the housing to in turn rotate drive pinions which are also mounted in the housing so that the drive pinions engage a drive gear on the drive shaft. A connection is thereby accomplished between the shafts by means of the drive gear, the drive pinions and the housing.

PATENTED JAN 12 1971

3,554,339

INVENTOR
WILLIAM S. RICHARDSON

BY
Thomas W. Ehrmann
ATTORNEY

OVERRUNNING POSITIVE AND SYNCHRONIZED CLUTCH

BACKGROUND OF THE INVENTION

This invention relates to an overrunning clutch adapted to connect a drive shaft to an externally driven shaft and which clutch is normally disengaged until the speed of the drive shaft reaches synchronization with the speed of the externally driven shaft.

There are situations in which it is necessary to employ a clutch for connecting shafts, which clutch will be normally disengaged or overrunning but which will be automatically engaged o connect the shafts when the speed of the shafts is the same. An instance of such application is the use of a gas turbine as a second source of power for a load which is also driven by a prime mover such as a diesel engine or stream turbine. In such instances it is normally desirable to start and to bring the gas turbine up to the speed at which another prime mover is driving the load and to then engage the gas turbine automatically as the speeds become synchronized so that the gas turbine functions as a source of power for the load. This is to prevent the gas turbine from acting as a drag on the load, to prevent damage to the gas turbine, and to permit the gas turbine to be shut down when its power is not required. Likewise, the gas turbine should not be connected to the load when running faster than the load because of the resulting shock loading which would occur to the possible damage of the clutch, gas turbine and other connected equipment.

Accordingly, an overrunning clutch in accordance with the invention will function to automatically engage when the speed of the dive shaft equals that of the speed of the externally driven shaft and to automatically disengage whenever the speed of the drive shaft falls below the speed of the externally driven shaft. Overrunning clutches to accomplish the same function have previously been proposed. An example is the overrunning clutch disclosed and described in my U.S. Pat. No. 3,246,726 which issued Apr. 19, 1966 for "Overrunning Clutch." However, the overrunning clutch of the present invention uses as its basic operating components a series of gears and pinions with meshing or engageable gear teeth which are economical to manufacture. Furthermore, the movement of the operating components to and from an engaged condition of the clutch is accomplished by the rolling engagement of gear teeth so that the transition between engaged and disengaged conditions are accomplished smoothly. The components of the clutch are dynamically balanced so that at high speeds there is no danger of the components being shifted in position unintentionally because of centrifugal forces. The result is a relatively inexpensive reliable overrunning clutch.

SUMMARY OF THE INVENTION

The overrunning clutch in accordance with this invention comprises a drive gear for mounting on a drive shaft, a housing about the drive gear and adapted for connection to an externally driven shaft, a drive pinion mounted for rotation in the housing and having an interrupted series of pinion teeth so that in its neutral position the drive pinion gear teeth are out of engagement with the drive gear, a sleeve surrounding the housing and being rotatably shiftable about the housing within a set limit, such sleeve having teeth which mesh with the drive pinion gear teeth to control the position of the drive pinion, and trigger means between the drive shaft and the sleeve, which trigger means is adapted to maintain the sleeve in a position in which the drive pinion is held in its neutral position so long as the speed of the driven shaft is relatively greater than the speed of the drive shaft and being further adapted to rotatably shift the sleeve to rotate the drive pinion into engagement with the drive gear when the speed of he drive shaft is in synchronization with the speed of the driven shaft whereby a driving connection is thereby completed from the drive gear, through the drive pinion to the housing and thereby to the driven shaft.

DESCRIPTION OF THE PREFERRED EMBODIMENTS

Figure 1:
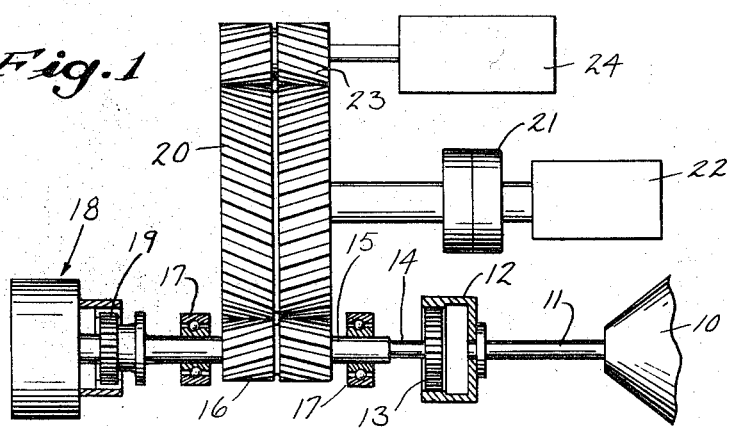
FIG. 1 is a generally schematic plan view of one embodiment of a drive incorporating the overrunning clutch of this invention

Referring to FIG. 1, there is shown therein a portion of a drive in which the clutch of this invention may be employed. A nonreversing gas turbine 10 has its output shaft 11 mounting an internally toothed coupling sleeve 12. A mating externally toothed coupling hub 13 is secured to a drive shaft 14 which extends through a hollow shaft 15 that mounts a pinion 16. The hollow shaft 15 is supported on pinion bearings 17. The shaft 14 mounts the clutch of this invention (designated generally by the numeral 18) and the clutch 18 has internal teeth which mesh with the teeth of a coupling hub 19 secured to the hollow pinion shaft 15.

In the arrangement illustrated in FIG. 1, the pinion 16 is one of a pair of pinions driving a bull gear 20 which is mounted on a shaft connected through a coupling 21 to a load such as a generator 22. The second driving pinion 23 is connected to a prime mover 24. Either the prime mover 24 or both of the gas turbine 10 and prime mover 24 may be used to drive the bull gear 20 and thereby drive the generator 22. When the prime mover 24 is driving the bull gear 20 the hollow shaft 15 is also driven by the prime mover 24.

Figure 2:
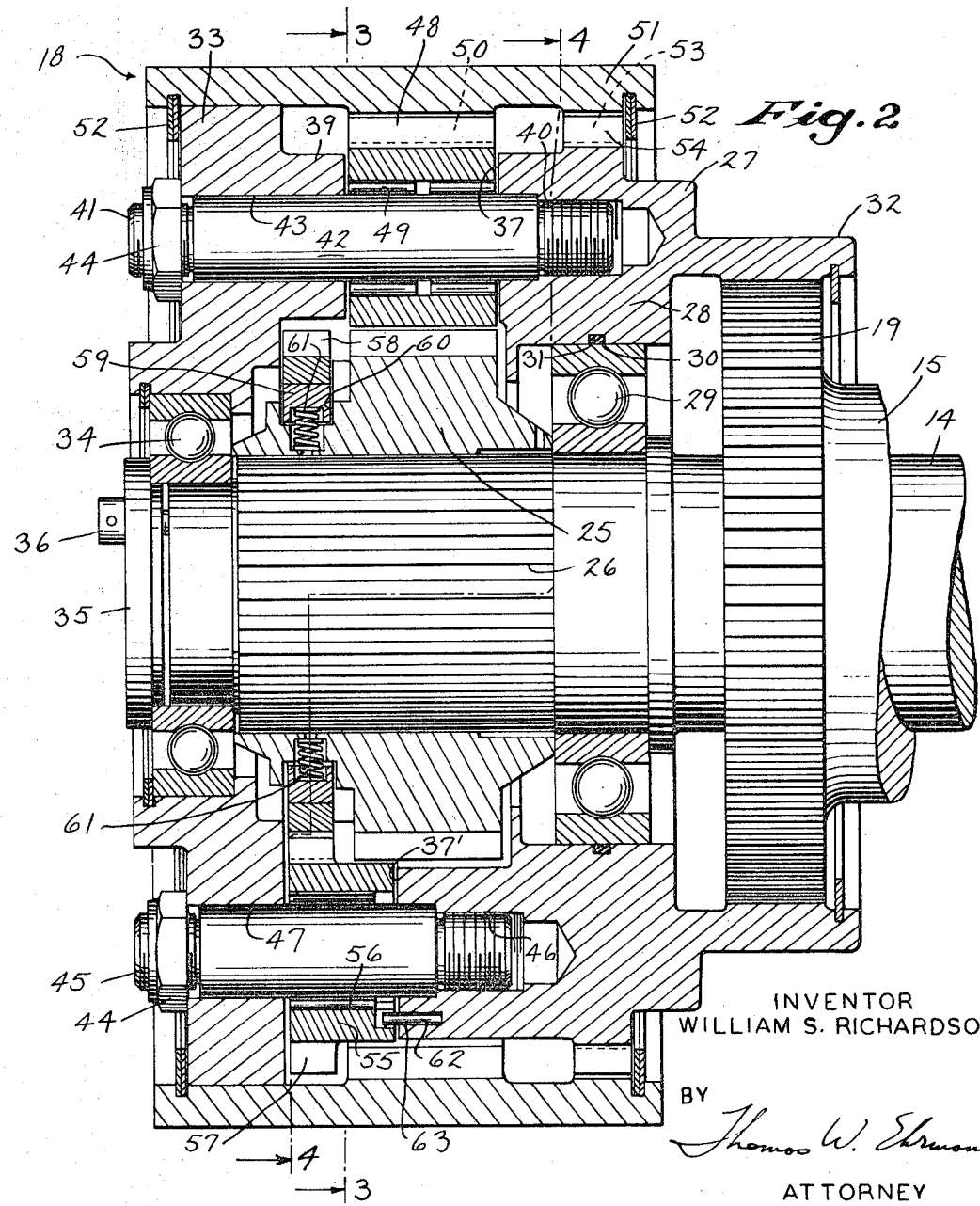
FIG. 2 is a view in vertical section through the clutch of FIG. 1 taken in the plane of the line 2-2 of FIG. 3 with portions thereof shown in side elevation.
Figure 3:
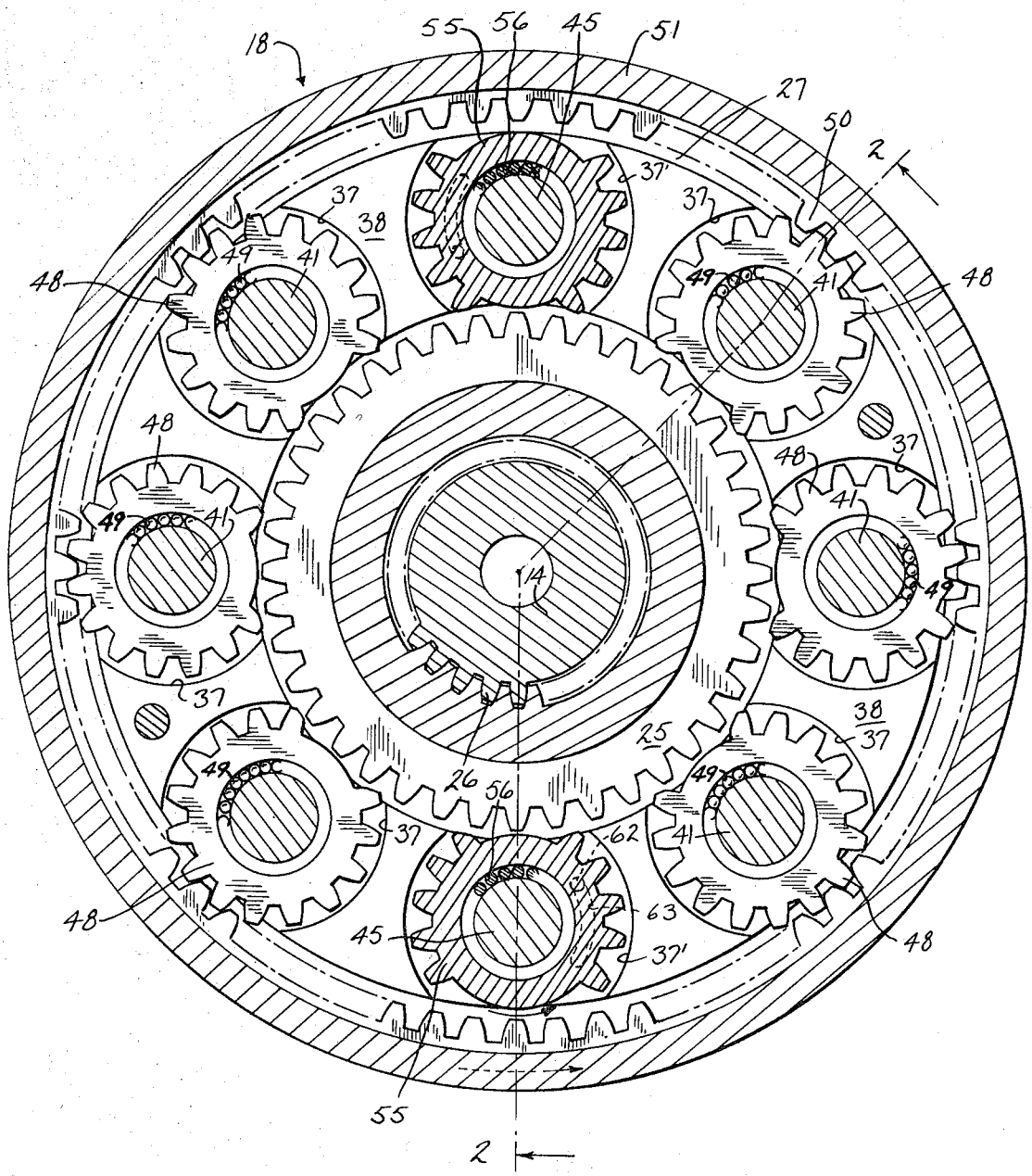
FIG. 3 is a view in vertical section taken in the plane of the line 3-3 of FIG. 2 and showing the clutch in its overrunning condition.
Figure 4:
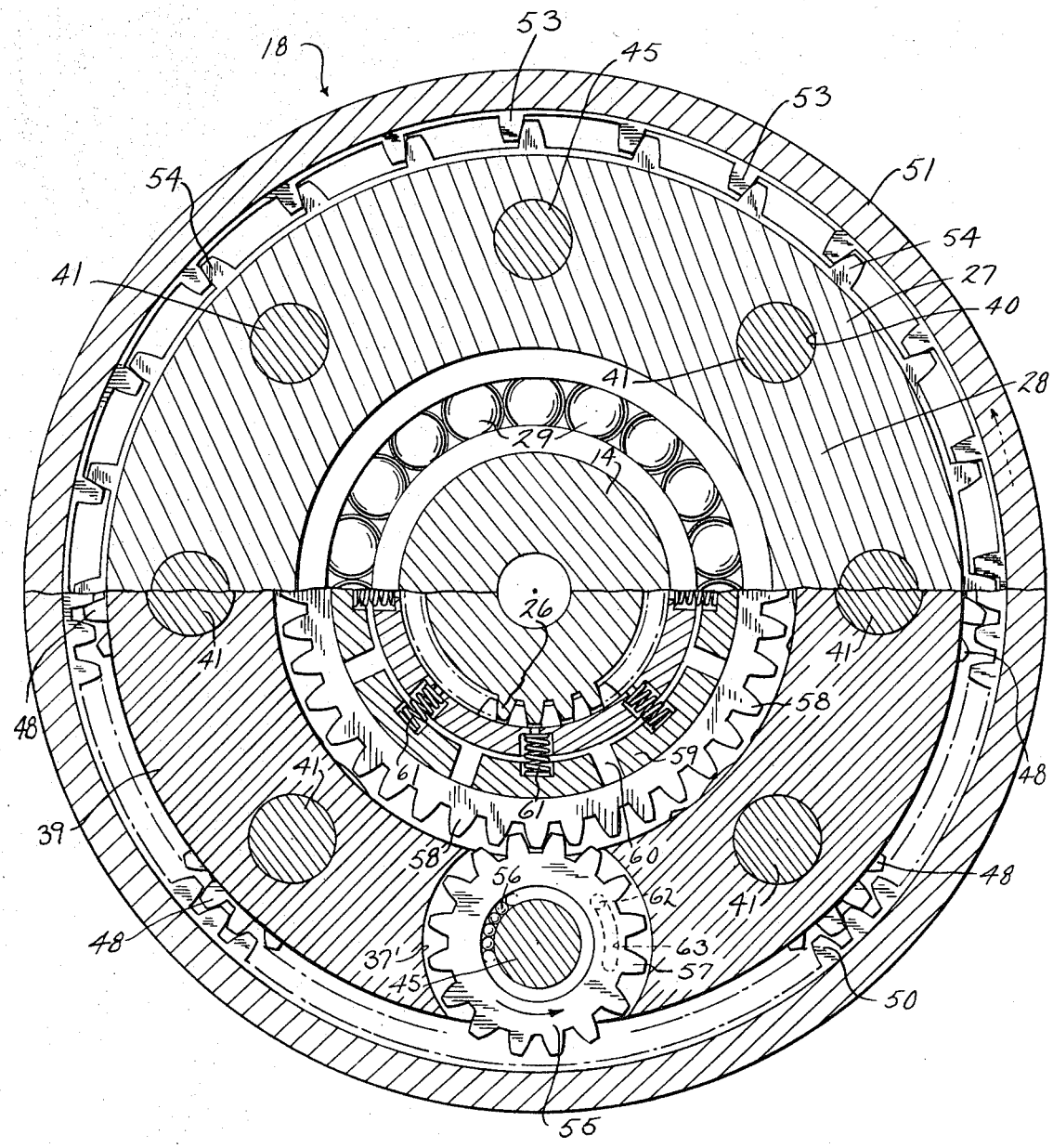
FIG. 4 is a view in vertical section taken in the plane of the line 4-4 of FIG. 2 and also showing the clutch in its overrunning condition.

Referring to FIGS. 2, 3 and 4, a drive gear 25 having external gear teeth is mounted on a splined portion 26 of the shaft 14. A housing member 27 has a central section 28 mounted on its inner periphery on the outer race of a ball bearing 29. The inner race of the ball bearing 29 is mounted on the shaft 14 to one side of the drive gear 25. An O-ring 30 secured in a groove 31 on the inner periphery of the central section 28 restrains the outer race of the bearing 29 from skidding. The housing member 27 has an outwardly projecting sleeve portion 32 having internal gear teeth which mesh with the teeth of the coupling hub 19 to thereby connect the housing member 27 to the externally driven shaft 15.

A housing plate 33 is mounted at its inner periphery on the outer race of a second ball bearing 34. The inner race of the second ball bearing 34 is mounted on the end of the shaft 14 to the opposite side of the drive gear 25. The inner race of the ball bearing 34 is axially restrained on the end of the shaft 14 by a cap plate 35 mounted to the end of the shaft 14 by capscrews 36.

As shown in FIG. 3, eight equally angularly spaced pockets 37 and 37' are bored in a face of the housing member 27 opposite the sleeve portion 32. As a result, eight projecting bosses 38 are formed. The outer surface of the bosses 38 lie in a common plane and seat against an annular projection 39 of the housing plate 33. The annular projection 39 is bored at diametrically opposed points to form a pair of pockets. Such pair of pockets correspond in location to pockets 37' in the housing member 27.

The housing member 27 is provided with a threaded bore 40 at the center of each of the six pockets 37. A bolt 41, having a central cylindrical portion 42, is received in each of the threaded bores 40. The bolts 41 extend through bores 43 in the housing plate 33 and a nut 44 is received on the projecting end of each bolt 41 and bears against the outer surface of the housing plate 33. Similar, although shorter, bolts are received at one end in threaded bores 46 disposed centrally of the shallower pockets 37'. The bolts 45 extend through bores 47 in the housing plate 33 and nuts 44 are again secured to the projecting threaded end of the shorter bolts 45. The bolts 41 and 45 function in part to secure the housing plate 33 to the housing member 27.

Six drive pinions 48 are mounted on needle bearings 49 about the cylindrical portions 42 of each of the bolts 41 within the pockets 37. The drive pinions 48 have two or more teeth removed and the teeth adjacent to the resulting space are relieved so that in the neutral position of the drive pinion 48 (as illustrated in FIG. 3) there is no engagement of the drive pinions with the teeth of the drive gear 25. The teeth of the drive pinions 48 do, however, engage a first series of internal gear teeth 50 on the inner periphery of a sleeve 51. The sleeve 51 is disposed about the housing member 27 and the housing plate 33 and is axially restrained at either end by snaprings 52.

A second series of internal gear teeth 53 are formed on the interior of the sleeve 51 spaced from the gear teeth 50. In this second series of internal gear teeth, the space width between teeth measured at the pitch circle is greater than the tooth thickness and by an amount in excess of that which normally might be provided for clearance in meshing gear teeth. In the embodiment shown, a normal series of internal gear teeth is first formed and then every two out of three teeth removed so that the space width is an odd multiple of the tooth thickness. An identically spaced series of external gear teeth 54 are formed on the outer periphery of the central section 28 of the housing member 27.

A pair of trigger pinions 55 are mounted on needle bearings 56 about the cylindrical portions of the bolts 45 within each of the pockets 37'. The trigger pinions 55 are provided with a complete series of gear teeth 57 at the end of the trigger pinions 55 nearest the housing plate 33 (see FIG. 4). However, certain of the gear teeth are removed from the trigger pinions 55 in the area in which the trigger pinions 55 overlap the drive gear 25 and the gear teeth 50 of the sleeve. Specifically, in the embodiment shown, two gear teeth are removed from the surface of the trigger pinions 55 opposing the gear teeth of the drive gear 25 and four teeth are removed from the surface of the trigger pinions opposing the gear teeth 50 of the sleeve.

The full toothed portions of the trigger pinions 55 are engaged by the teeth of a sun gear 58. The inner peripheral surface of the sun gear 58 is in frictional contact with eight small friction shoes 59 which are disposed within an annular groove 60 about the drive gear 25. Initial bearing loads between the friction surfaces of the shoes 59 and the sun gear 58 is provided by radial springs 61 which bottom in recesses in the drive gear 25 and shoes 59.

The clutch illustrated in FIGS. 3 and 4 is adapted for use with a gas turbine in which the gas turbine shaft rotates in a clockwise direction as viewed in FIGS. 3 and 4. A blocking pin 62 is inserted within the housing member 27 within each pocket 37'. The pin 62 projects outwardly of the housing member 27 and rides in an arcuate groove 63 in the face of each trigger pinion 55. The ends of the arcuate grooves 63 are so positioned relative to the teeth on each trigger pinion 55 that the blocking pin 62 will engage one end of the groove 63 when the trigger pinion is in its neutral position in which the teeth of the trigger pinion 55 are free of both the drive gear 25 and the teeth 50 of the sleeve 51. When the trigger pinions 55 have been rotated in a counterclockwise direction in an amount sufficient to engage the teeth of the trigger pinion 55 with both the drive gear 25 and the teeth 50 of the sleeve 51, the pin 62 will be in the groove 63 and out of contact with either end thereof.

The clutch of FIGS. 3 and 4 will operate to engage the drive shaft 14 with the driven shaft 15 whenever the speed of the shaft 14 reaches and minutely exceeds synchronization with the speed of the shaft 15. Conversely, the clutch will be disengaged whenever the speed of the shaft 15 exceeds the speed of the shaft 14. The specific operation of the clutch is as follows:

Assume that the bull gear 20 is being driven by the prime mover 24 in a counterclockwise direction (as viewed in FIGS. 3 and 4) and it is desired to connect the gas turbine 10, as well, to drive the bull gear 20. The gas turbine 10 should not be connected to the shaft 15 to drive the bull gear 20 until its speed reaches that of the shaft 15. Since the bull gear is being driven at a particular speed by the prime mover 24, the shaft 15 is being rotated and likewise the housing comprising the housing member 27 and housing plate 33 are being driven in a clockwise direction as viewed in FIGS. 3 and 4. If the gas turbine shaft 14 is stopped or is rotating in a clockwise direction at a speed less than the speed of the shaft 15, a frictional drag will be created on the sun gear 58 by the drag of the shoes 59 on the inner periphery of the sun gear 58. This frictional drag will tend to retard the clockwise rotation of the sun gear 58. Because the housing is rotated in a clockwise direction, the axes of the bolts 45 which mount the trigger pinions 55 will likewise be rotated through a circular path in a clockwise direction. Since the sun gear 58 is being retarded, the trigger pinions 55 will tend to rotate in a clockwise direction about the bolts 45 but such rotation is checked by the pin 62. Therefore, under the stated conditions the positions of the components of the clutch will be as illustrated in FIG. 3. In such condition, there is no driving connection between the shaft 14 and the shaft 15. This is the overrunning condition of the clutch.

As the gas turbine 10 is brought up to speed to match the existing speed of the shaft 15, the above conditions are unaffected until the speed of the shaft 15 and the turbine shaft 14 are the same. With any phase advance of the turbine shaft 14 with respect to the shaft 15, the friction force on the sun gear 58 will reverse in direction. This will tend to accelerate the sun gear 58 and the trigger pinions 55 will thereby be rotated by the sun gear 58 in a counterclockwise direction from its neutral position. Rotation of the trigger pinions 55 in a counterclockwise direction will engage the teeth of the trigger pinions with the teeth of the drive gear 25 and with the teeth 50 of the sleeve 51. Such counterclockwise rotation of the trigger pinions 55 will force the sleeve 51 to be retarded relative to the movement of the housing so that there will be a shift in relative position of the sleeve 51 in a counterclockwise direction (dotted arrow on FIGS. 3 and 4) within the limit permitted by the space between the external teeth 54 of the housing member 27 and the second series of internal teeth 53 of the sleeve 51. This shift in relative position of the sleeve 51 also has the effect of rotating the drive pinions 48 in a counterclockwise direction from their neutral position to a position in which the teeth of the drive pinions 48 mesh with the drive gear 25. Thus, there is a direct connection between the shaft 14 and the shaft 15 through the drive gear 25, the drive pinions 48, the bolts 41, and the housing.

Should the speed of the gas turbine fall below that of the shaft 15, the clutch will return to an overrunning condition. The return to an overrunning condition is accomplished by the direct action of the drive gear 25 on the teeth of the drive pinions 48 such that the drive pinions will be rotated back to their neutral position and the sleeve 51 will be shifted back to its original position. The shifting of the sleeve 51 will also rotate the trigger pinions until they are disengaged from the sleeve, after which the friction drag of the shoes 59 on the sun gear will complete the movement of the trigger pinions 55 to their neutral position.

To change either embodiment of the clutch from one which is adapted to operate on clockwise rotation of the shafts 14 and 15 as viewed in FIG. 3 to one which is adapted to operate for counterclockwise rotation of those shafts it is only necessary to position the blocking pins 62 such that they would bottom on the opposite end of the arcuate grooves 63 when the trigger pinions 55 are in their normal disengaged position and to initially assemble the sleeves 51 and 66 in a neutral position which permits net relative rotation of the sleeves in a clockwise direction for engagement of the clutch.

It will be seen that the clutch utilizes gears and pinions as its basic operating components. Such components can be machined on normal gear cutting equipment without special tooling. Those series of gear teeth which vary from the norm, such as on the trigger pinions and drive pinions, and the series of teeth 43, 54 and 68 are preferably cut first as a normal series of teeth and then teeth are removed and relieved to provide the special tooth arrangements illustrated.

The bearings and the shoes 59 require lubrication for the proper operation of the clutch. The lubricant may be provided in a number of ways known to persons skilled in the art. The means for providing such lubrication forms no part of the present invention.

I claim:

1. In a clutch for connecting a drive shaft to an externally driven shaft, the combination comprising:

a drive gear adapted to be mounted on said drive shaft;

a housing disposed about said drive gear and adapted to be drivingly connected to said externally driven shaft, said housing having a series of external gear teeth disposed about its periphery, the space width between said external gear teeth being substantially greater than the tooth thickness;

a drive pinion rotatably mounted on said housing and having an interrupted series of pinion gear teeth, said drive pinion being adapted to be rotatably shifted between a neutral position in which said pinion gear teeth are out of engagement with said drive gear and a drive position in which said pinion gear teeth are engaged with said drive gear;

a sleeve surrounding said housing and including a first series of internal gear teeth in mesh with said drive pinion gear teeth and a second series of internal gear teeth engageable with said external gear teeth of said housing, the space width between the internal gear teeth of said second series being substantially greater than the tooth thickness, said sleeve being rotatably shiftable about said housing within the limits of the space between said external gear teeth and said second series of internal gear teeth; and trigger means between said drive shaft and said sleeve, said trigger means being adapted to maintain said sleeve in a position in which said drive pinion is in its neutral position so long as the speed of said driven shaft is relatively greater than the speed of sad drive shaft, said trigger means being further adapted to shift said sleeve and to thereby shift said drive pinion to its drive position when the speed of said drive shaft is relatively greater than the speed of said driven shaft, whereby a driving connection is established from said drive shaft through said drive gear, said drive pinion, and said housing to said driven shaft.

2. A clutch in accordance with claim 1 wherein said trigger means comprises:

a trigger pinion mounted in said housing and having an interrupted series of pinion teeth, said trigger pinion being adapted to be rotatably shifted in one direction from a neutral position in which said pinion teeth are out of engagement with said first series of internal teeth of said sleeve to a position in which said trigger pinion teeth engage said first series of internal teeth of said sleeve and shift said sleeve to have the teeth of said drive pinion mesh with said drive gear;

means preventing rotation of said trigger pinion in an opposite direction;

a sun gear in mesh with said trigger pinion; and means drivingly connectable to said drive shaft and frictionally engaging said sun gear to have said sun gear tend to rotate said trigger pinion in said opposite direction when the speed of said driven shaft is relatively greater than the speed of said drive shaft, and to have said sun gear rotatably shift said trigger pinion in said one direction when the speed of said drive shaft is relatively greater than the speed of said driven shaft.

3. A clutch in accordance with claim 2 wherein:

said housing comprises a housing member and a housing plate mountable for rotation on said drive shaft on opposite sides of said drive gear;

said driving pinion an trigger pinion are rotatably mounted on shafts connecting said housing member and housing plate; and said sun gear is disposed about said drive shaft.

4. A clutch in accordance with claim 3 wherein said means drivingly connectable to said drive shaft and frictionally engaging said sun gear comprises:

a ring member mountable on a hub extending axially from said drive gear for rotation therewith; and a plurality of shoes supported by said ring member and biased radially outwardly to have said shoes yieldingly engage the inner peripheral surface of said sun gear.

5. A clutch in accordance with claim 3 wherein there is a pair of trigger pinions and a plurality of drive pinions equally angularly spaced on shafts in said housing, and wherein the space width between said external gear teeth and the space width between the internal gear teeth of said second series are both equal to the same odd multiple of tooth thickness.